UNITED STATES PATENT OFFICE.

ISADOR LADOFF, OF PITTSBURGH, PENNSYLVANIA, ASSIGNOR TO WESTINGHOUSE ELECTRIC AND MANUFACTURING COMPANY, A CORPORATION OF PENNSYLVANIA.

PROCESS OF PURIFYING METALS.

1,248,593.   Specification of Letters Patent.   Patented Dec. 4, 1917.

No Drawing.   Application filed May 11, 1914.   Serial No. 837,713.

*To all whom it may concern:*

Be it known that I, ISADOR LADOFF, a citizen of the United States, and a resident of Pittsburgh, in the county of Allegheny and State of Pennsylvania, have invented a new and useful Improvement in Processes of Purifying Metals, of which the following is a specification.

My invention relates to processes of purifying metals, and its object is to provide a process of removing absorbed gases from molten metals and alloys, and to thereby improve the physical and chemical properties of castings made from such metals.

When molten metals and alloys are exposed to the air, they greedily absorb oxygen, nitrogen and other gases, with the result that, when they solidify, they form spongy masses full of blow-holes. In order to obtain solid castings, it is necessary to remove such absorbed gases, and, for this purpose, certain deoxidizing and denitrifying substances are commonly added to the molten material before it is cast. For this purpose, it is preferable to use substances which do not combine or intimately intermingle with the molten material, but which, after having accomplished the removal of the occluded gases, form a slag which may be readily removed, leaving the metal substantially free both from gases and from the purifying substance. Boric oxid ($B_2O_3$) is a well known example of the gas-removing substances at present employed.

I have discovered that certain basic or unsaturated metallic oxids, such as the suboxids of titanium, tungsten, vanadium and other metals, are highly efficient gas-removing substances. These basic oxids may be added to the molten metal to be purified, either in the form of the basic oxids themselves or mixtures of them, or in the form of a conglomerate containing one or more of these basic oxids and a suitable carrier.

I have made the further discovery that an improved method of treating molten metals with gas-removing substances consists in adding the gas-removing substance in the form of an intimate mixture of such substance with the metal to be purified.

If, for example, molten copper is to be purified by means of titanium suboxid, I find it convenient to employ a more or less alloyed conglomerate of copper and the titanium suboxid, the conglomerate being prepared in the following manner. I first make an intimate mixture of cuprous oxid and titanium suboxid, by grinding these oxids together, and I form pellets of this mixture, using a binder such as water, glycerin, glucose, or the like, and dry the pellets for some time, first in the air and then at a moderate heat in a suitable oven. I then pack the dried pellets in a clay receptacle in a bed of powdered charcoal, coke, or any other reducing medium, seal the receptacle with a suitable refractory luting material, and then subject the receptacle and its contents to heat, the heat being gradually raised to a maximum of approximately 1100° C. and maintained at that temperature for two hours or more. The temperature is then lowered, as gradually as it was raised, until a temperature of about 300° C. is reached, and the receptacle is then allowed to cool to room temperature. The entire heating may be accomplished in about twenty-four hours.

The pellets are then removed from the receptacle and may be ground, the resulting powder, or the pellets themselves without grinding, being used as a gas-removing substance for the treatment of molten copper. The powder or pellets may be scattered upon the surface of the molten metal, or, if it is necessary to prevent all possibility that the gases of the air may be absorbed by the purifying agent, the powder or pellets may be inclosed in a thin-walled copper cartridge and held beneath the surface of the molten copper by means of a rod of graphite or other refractory material.

The treatment of the mixed cuprous oxid and titanium suboxid in the presence of a reducing agent effects partial alloying of the copper and the titanium by a process of reduction and cementation which is more fully described and claimed in my Patent No. 1,040,699, granted to me October 8, 1912, and also in my Patent No. 1,042,694, granted to me October 29, 1912. While the more or less alloyed conglomerates prepared in the manner just described are well adapted to the refining of metals according to my process, it is to be understood that I may also employ alloys and mixtures prepared by other methods.

When metals other than copper are to be purified, partial alloys of such metals with the suboxid of a gas-removing metal, such as titanium, may be prepared by mixing an oxid of the metal to be purified with the suboxid of the gas-removing metal and treating the mixed oxids in the manner just described. Thus, for the purification of iron, a mixture of iron with titanium suboxid, or other suitable suboxid, may be used, and similar mixtures of metallic suboxids with zinc, tin, lead and other metals may be similarly prepared.

When the molten metal to be purified is an alloy, I prefer to combine the gas-removing suboxid with the chief constituent of the alloy to be treated, the process being carried out just as I have described it in connection with the purification of single metals.

While I have described titanium suboxid as the gas-removing substance to be used in carrying out my process, it is to be understood that my process is not restricted to the use of this substance. In some instances, it is desirable to use metallic compounds which are capable of removing particular gases, and in such cases, the compounds employed may be used in the manner described above in connection with titanium suboxid. For instance, denitrifying substances which may be so used are the oxids of the rare earth metals such as cerium, thorium or zirconium.

In view of the wide range of conditions to which my invention is applicable, it is to be understood that no limitations are to be imposed unless indicated in the appended claims.

I claim as my invention:

1. The process of purifying molten metal that consists in adding to the molten metal a gas-removing substance containing titanium suboxid.

2. The process of purifying molten metal that consists in adding to the molten metal an intimate mixture containing titanium suboxid mixed with the metal to be purified.

3. The process of refining copper which consists in adding to the molten copper a substance containing a conglomerate including copper and titanium suboxid and removing the resulting slag.

4. A gas-removing agent for use in the purification of molten metals comprising titanium suboxid.

5. A gas-removing agent for use in the purification of molten metals comprising a mixture containing titanium suboxid mixed with the metal to be purified.

6. A gas-removing agent for use in the purification of molten metals comprising a mixture containing titanium suboxid and an alloy containing titanium alloyed with the metal to be purified.

In testimony whereof, I have hereunto subscribed my name this 30th day of April, 1914.

ISADOR LADOFF.

Witnesses:
GOLDIE E. MCGEE,
B. B. HINES.